United States Patent [19]
McDermott

[11] 3,975,670
[45] Aug. 17, 1976

[54] OVERVOLTAGE PROTECTOR FOR BATTERY OPERATED DEVICES

[76] Inventor: Julian A. McDermott, 1639 Stephen St., Brooklyn, N.Y. 11327

[22] Filed: May 2, 1973

[21] Appl. No.: 356,504

[52] U.S. Cl. .................................. 320/13; 320/18; 320/39; 320/51; 323/15; 323/96
[51] Int. Cl.² ..................... H02J 7/00; G05F 3/08
[58] Field of Search .............. 320/9, 10, 13, 15, 17, 320/18, 39, 40, 50, 51; 323/8, 22 T, 225 CR, 15, 94, 96; 307/49, 50

[56] References Cited
UNITED STATES PATENTS

| | | | |
|---|---|---|---|
| 1,804,768 | 5/1931 | Harbecke | 320/18 |
| 3,082,370 | 3/1963 | Halliday | 320/39 X |
| 3,085,186 | 4/1963 | Ruetschi | 320/13 |
| 3,281,639 | 10/1966 | Potter et al. | 320/39 X |
| 3,321,692 | 5/1967 | Walsh | 320/40 |
| 3,343,073 | 9/1967 | Mesenhimer | 307/49 X |
| 3,365,645 | 1/1968 | Jacobs | 320/39 X |
| 3,546,573 | 12/1970 | Coccia | 323/96 |
| 3,646,439 | 2/1972 | Broski | 323/22 SC X |

FOREIGN PATENTS OR APPLICATIONS

| | | | |
|---|---|---|---|
| 119,147 | 5/1943 | Australia | 320/18 |

Primary Examiner—J D Miller
Assistant Examiner—Robert J. Hickey
Attorney, Agent, or Firm—Ernest Schneebaum

[57] ABSTRACT

The present invention has reference to a voltage control circuit for a battery operated device. Such circuits are adapted for use in connection with buoys, signal lights, vehicles and other devices where exhaustion, internal resistance, polarization or other factors would cause a drop in voltage during use. The loss in power is minimal.

7 Claims, 4 Drawing Figures

OVERVOLTAGE PROTECTOR FOR BATTERY OPERATED DEVICES

BACKGROUND OF THE INVENTION

Many sources of power such as batteries are of such nature that for diverse reasons the voltage supplied to the load varies with use. This may seriously affect the performance of the device acting as the load and the overall power consumption.

Voltage regulation is generally accomplished in such circuits by putting a suitable and desirable impedance in the line. This provides a drop in voltage which increases with the current and hence reduces the voltage applied to the load. This voltage drop may be increased by a circuit paralleling the load which decreases in resistance as the voltage increases, thus increasing the overall current and the voltage drop in the series resistance. This maintains a reduced voltage.

The disadvantage of this method resides in the fact that there is a substantial loss in wattage while the voltage is high, but losses in the series resistance continue when the voltage of the source drops.

SUMMARY OF THE INVENTION

Broadly, the present invention contemplates the use of a source of direct current, a load, connections from the source of current to the load, said connections including at least two paths for the current to flow from the source to the load, means whereby to sense the voltage and to automatically select the path providing the lower voltage when the voltage supplied by the source of current is above an acceptable limit.

An essential feature of the present invention resides in obtaining a high degree of efficiency in the use of the energy from its source.

Another advantage of the present invention lies in the prevention of damage to the load device which may be caused by excessive voltages. This would be accomplished without a continuous and substantial loss of power when the source voltage decreases.

These and other meritorious aims and advantages, which will become more fully apparent as the description hereof proceeds, are attained by the novel combination and arrangement of parts, hereinafter described, and illustrated in the accompanying drawing, constituting a material component of the present disclosure, and in which:

DESCRIPTION OF THE INVENTION

Figure 1:
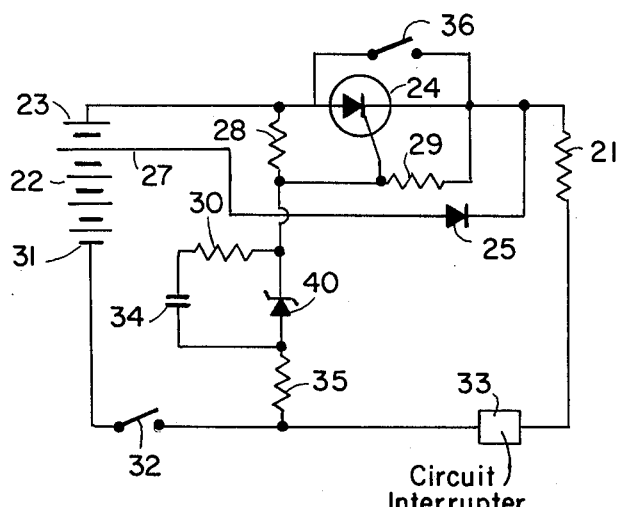
FIG. 1 is a diagram of a circuit illustrating the principal embodiment of the present invention wherein silicon controlled rectifiers are used.

Throughout this description, identical elements will be referred to by identical reference numerals.

Referring in greater detail to the drawing, and more particularly to FIG. 1, the numeral 21 illustrates the load used in connection with the invention, 22 is the battery source of power, the said battery having an extra cell 23, a silicon controlled rectifier (SCR) shown at 24, 25 is a diode rectifier, 40 is a zener diode with a breakover voltage above the value of the voltage at the battery tap at 27, but below the voltage of the complete battery pack including cell 23. Resistors 28 and 29 constitute a voltage divider and current limiting section of the circuit, and 31 is the negative battery terminal.

Figure 2:
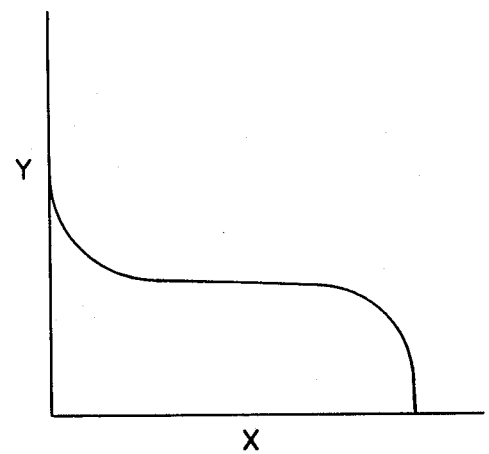
FIG. 2 illustrates a diagram showing the typical voltage-time characteristic for a dry cell battery under load.

FIG. 2 illustrates a typical voltage time curve for a typical loaded "Leclanche" type cell. In this drawing the X axis is for time and the Y axis is for voltage. It is to be noted that excess voltage exists initially but drops to a substantial flat segment before finally failing. If the function of the battery is to activate an incandescent lamp, the initial high voltage can cause it to burn out.

The circuit illustrated in FIG. 1 functions in the following manner:

When switch 32 is closed, the voltage of the complete battery including cell 23 is applied. However, the excess voltage causes zener 40 to conduct. The current causes the biasing of the SCR 24 so that said SCR is non conductive. The current can thus flow only to the load through the circuit containing blocking diode 25 producing at the load a lower voltage than that of the full battery.

When the battery voltage due to usage drops, zener 40 becomes non conductive. The biasing of SCR 24 becomes such that it is conductive. Thus the higher voltage is supplied to the load.

If the current is flowing through the SCR and is interrupted by a switch as at 32, by a flasher or current interrupter as at 33, by a bypass circuit as at 36, or otherwise sufficiently reduced, and if after that time the voltage of the battery pack has recovered sufficiently so that the zener 40 is conductive, upon resumption of the normal operating conditions the SCR would be non conductive. The current from the complete battery pack would then not be applied to the load.

Condenser 34 and resistor 30 and 35 may be used to prevent breakover of the zener and conduction of the SCR due to transient conditions.

The circuit may also be so arranged that the change in voltage to the load may be done in more than one step using a number of lower voltage diode (25) bypass circuits battery taps and sensors.

Figure 3:
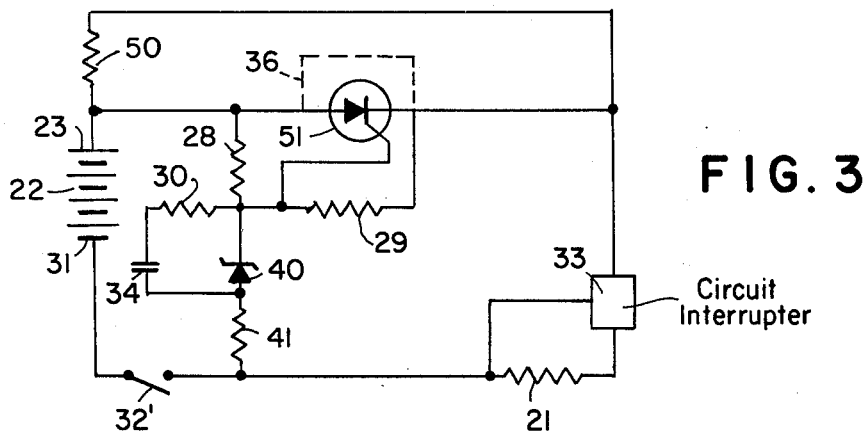
FIG. 3 is another modification of the present invention showing the use of a resistance in a conducting line to obtain reduced voltage.

FIG. 3 illustrates a circuit wherein voltage reduction may be achieved by the use of a resistance instead of a battery tap. In this circuit, which the battery voltage is high, the resistance is in the circuit. When the voltage drops, the resistance is bypassed. Since the higher battery voltage normally exists only for a short part of the battery life, no substantial loss of power results.

Figure 4:
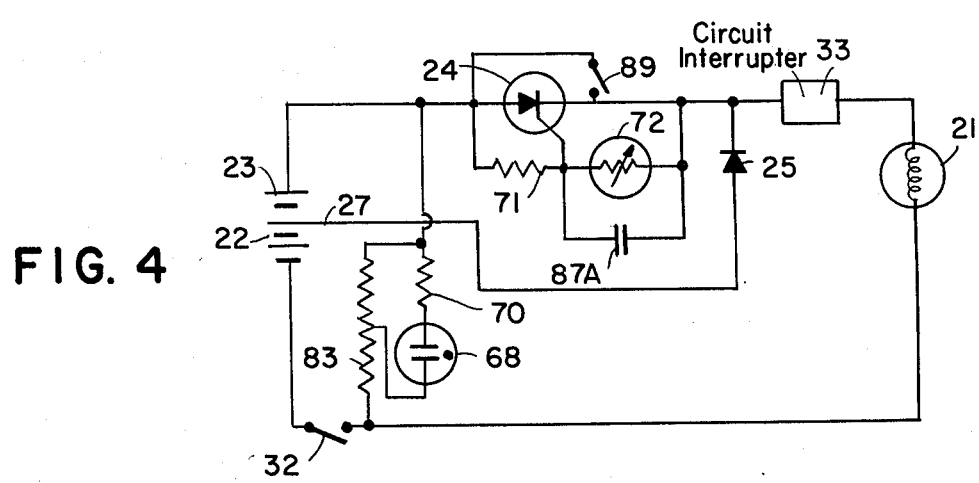
FIG. 4 illustrates a modification of the arrangement illustrated in FIG. 1 wherein a neon lamp is used as the voltage sensitive element.

In FIG. 4 the numeral 22 relates to the battery, 31 is the negative terminal, 50 is a voltage reducing resistor, and 51 is a silicon controlled rectifier.

When the battery voltage is high, the zener 40 is conductive. This results in the biasing of the silicon controlled rectifier 51 rendering it non conductive. The current then flows to the load thru resistor 50 effectively reducing the load voltage. If the battery voltage is low, the zener is non conductive and the current flows to the load 21 bypassing the resistor 50. Resistors 28 and 29 and 41 serve as voltage dividers and current limiters. Condenser 34 and resistor 30 may be used to provide means to avoid inadvertent firing of SCR 51 by transients. The total load illustrated in FIG. 3 includes a flasher or other current interrupter 33 and a load device 21.

A characteristic of the SCR is that once it is biased so that it is conductive it remains conductive even if the biasing is changed or removed. Thus in this circuit the current would flow directly to the load 21 avoiding the resistor 50 even if the battery voltage recovered due to some reason. To avoid this, interrupting devices such as the flasher 33 switch 32 or bypass switch 36 may be used forcing the SCR to be momentarily now conductive. Resistor 30 and condensor 34 are used to offset the effect of transient conditions.

In FIGS. 1 and 3 zeners are illustrated. However, it is to be understood that the word "zener" is used in its broadest sense as a generic term and relates to any suitable and desirable voltage responsive impedance device. If desired, other devices such as neon lamps can be used when the voltages are sufficiently high and these may be connected directly or light coupled to the control elements of the circuit.

FIG. 4 illustrates a circuit arrangement wherein a sensitive device is employed. In this diagram, the neon type lamp 68 emits light when the voltage is high and in response a photo sensitive device 72 such as a photo resistor, which in combination with element 71 constitutes a voltage divider, drops in resistance. The SCR 24 is not activated and current flows to the load 21 through a circuit interrupter or flasher 33 via diode rectifier 25 at a lower voltage. In the circuit illustrated in FIG. 4, 87A is a condenser which provides time delay and prevents premature or transient activation of the SCR and 83 is a voltage dividing resistance. The numeral 70 refers to a current limiting resistance while 83 is a voltage divider.

When neon lamp 68 is extinguished due to insufficient voltage, an increase in resistance of the photo sensitive device 72 is produced. Thus sufficient voltage is applied to the gate of the SCR to cause it to be activated. The current then flows directly from the battery through the added cell resulting in a higher voltage at the load.

When the current is interrupted by the action of the current interrupter or flasher 33, the switch 32, or is bypassed around the SCR by the bypass switch 36 the SCR is momentarily not conducting. If the battery voltage for some reason has risen sufficiently, the current will flow through the diode (25) circuit when the interruption is removed. The switches or bypass may be photoelectrically controlled and depend upon ambient lighting conditions.

In the several diagrams of the present invention, wherever solid state devices are shown, teams of such devices may be necessary where loads, voltages and efficiency require.

In all of the circuits shown, the transition from a condition of excessive voltage to the condition of acceptable voltage is accomplished in one step. However, if voltage variations are severe, it may be more desirable to use multiple step means.

The circuits hereabove described contemplate the use of SCR's for switching. It is to be noted that such circuits are less effective except when used in connecton with circuit switches, flashers or daylight switched circuits (photoelectric) where interruption is assured. The reason for this is that once the SCR's are activated, the current through them must be interrupted before the circuit will again become selective to voltage.

Where SCR's are used, it may be advantageous for greater efficiency to include time delay circuits in order to prevent premature action. Such arrangements are shown in FIG. 1 and are of common knowledge, and are universally applicable.

The circuits such as in FIG. 1 in which battery taps are made at a lower voltage are particularly adapted for use in connection with circuits and loads wherein variations in current occur and the operation of the load would be affected. A line resistance would change the load voltage with changes in current.

There has thus been shown and described an "Overvoltage Protector for Battery Operated Devices", in the best known form of its embodiment and in several modifications thereof. It is to be understood that the foregoing is to be regarded as illustrative and descriptive only of the best known forms of the present invention and not as limitative or restrictive to the exact details shown, applicant reserving the right to make changes and modifications in the present invention as come within the scope of the appended claims without thereby departing either from the spirit or scope of the present invention.

Having thus described the invention, what is claimed as new and desired to secure by Letters Patent, is:

1. In combination a battery comprising a plurality of cells, a load terminal, a blocking diode connected between a tap on one of said cells below the full voltage point of the battery and said load terminal, voltage sensing circuitry and silicon controlled rectifier switching means responsive thereto to cause conduction from a higher voltage battery tap to the load terminal instead of from the lower voltage tap when the battery voltage falls below a predetermined value, current control means to intermittently reduce the current through said silicon controlled rectifier below its holding value.

2. In combination, a battery comprising a plurality of cells, a load terminal, a blocking diode directly connected between a tap on one of the said cells below the full voltage point of the battery and said load terminal, voltage sensing circuitry and silicon controlled rectifier switching means responsive thereto to cause conduction from a higher voltage battery tap to the load terminal instead of from the lower voltage tap when the battery voltage falls below a predetermined value, current control means for repeatedly interrupting the current through said silicon controlled rectifier.

3. In a voltage control system for a device to be operated from a power source subject to voltage variations; first circuitry including a resistance connected between said source and a load terminal, second circuitry connected between said source and the load terminal, said second circuitry including silicon controlled rectifier switching means and voltage sensing components including a zener; said second circuitry being so responsive to its voltage sensing components that current would be caused to flow thru said silicon controlled rectifier to the load terminal when the voltage is below a predetermined value but if the silicon controlled rectifier current were interrupted to the extent that its current was below its holding value, current would flow to the load terminal through the first circuit if at that time the battery voltage was above the predetermined value; current control means to repeatedly reduce the current through the said silicon controlled rectifier to below its holding value.

4. In a voltage control system for a device to be operated from a power source subject to voltage variations;

first circuitry including a resistor connected between said source and a load terminal, second circuitry connected between said source and the load terminal, said second circuitry including a silicon controlled rectifier switching means and voltage sensing components including a zener; said second circuitry being so responsive to its voltage sensing components that current would be caused to flow through the silicon controlled rectifier to the load terminal when the voltage is below a predetermined level, but if the silicon controlled rectifier current is reduced below the holding value for the silicon controlled rectifier, upon resumption of normalcy current would flow to the load terminal through said first circuit if the battery voltage was above said predetermined value; and current control means to repeatedly reduce the current through said silicon controlled rectifier below said holding value.

5. In combination, a battery comprising a plurality of cells, a load terminal, blocking diode means connected between a tap on one of the said cells below the full voltage point of the battery and said load terminal, voltage sensing circuitry including light emitting means, said circuitry being responsive to the battery voltage, sensing and silicon controlled rectifier switching means responsive to said light emitting means, said silicon controlled rectifier switching means being so connected between a higher voltage point on said battery and said load terminal that conduction through said silicon controlled rectifier to the said load terminal occurs when the battery voltage falls below a predetermined value and current control means to repeatedly reduce the current through said silicon controlled rectifier below its holding value.

6. In combination, a battery comprising a plurality of cells, a battery tap at a point below full battery voltage, circuitry including a blocking diode between said tap and a load terminal, battery voltage sensing circuitry including light emitting means connected to said battery, circuitry responsive to said light emitting means, said circuitry including silicon controlled rectifier switching means so positioned, constituted and connected between a battery tap at a higher voltage and said load terminal as to effect conduction from the higher voltage battery tap to said load terminal when the battery voltage falls below a predetermined value and current control means to intermittently reduce the current through the silicon controlled rectifier to below its holding value.

7. In a voltage control system for a device to be operated from a power source subject to voltage variations, a first circuitry connected between said power source and a load terminal, a second circuitry connected between said power source and said load terminal, said second circuitry including a resistor, voltage sensing circuitry including light emitting means connected to said power source, silicon controlled rectifier switching and light sensing means in said first circuitry so responsive to said light emitting means as to effect the sending of the current through the second circuitry when the voltage of said power source is excessively high, and current control means to intermittently achieve reduction of the current through the silicon controlled rectifier to below its holding value.

* * * * *